United States Patent
Liu (10) Patent No.: US 10,158,311 B2
(45) Date of Patent: Dec. 18, 2018

(54) ELECTRONIC SWITCH CONTROL METHOD

(71) Applicant: Shanghai Baicheng Electric Equipment Manufacture Co., Ltd., Shanghai (CN)

(72) Inventor: Zhengbing Liu, Shanghai (CN)

(73) Assignee: Shanghai Baicheng Electric Equipment Manufacture CO., LTD., Shanghai (CN)

( * ) Notice: Subject to any disclaimer, the term of this patent is extended or adjusted under 35 U.S.C. 154(b) by 0 days.

(21) Appl. No.: 15/645,274

(22) Filed: Jul. 10, 2017

(65) Prior Publication Data

US 2017/0310258 A1  Oct. 26, 2017

Related U.S. Application Data

(63) Continuation of application No. 14/368,050, filed on Jun. 23, 2014, now Pat. No. 9,762,157.

(51) Int. Cl.
| | |
|---|---|
| *H02P 7/29* | (2016.01) |
| *H02P 29/68* | (2016.01) |
| *H02P 23/00* | (2016.01) |
| *G05B 19/042* | (2006.01) |

(Continued)

(52) U.S. Cl.
CPC .............. *H02P 7/29* (2013.01); *G05B 19/042* (2013.01); *G05B 19/4142* (2013.01); *H02P 23/0004* (2013.01); *H02P 29/68* (2016.02); *G05B 2219/37431* (2013.01); *G05B 2219/42237* (2013.01); *G05B 2219/45127* (2013.01); *H02P 31/00* (2013.01)

(58) Field of Classification Search
CPC ...... H02J 2009/068; H02P 27/08; H02P 6/28; H02P 23/14; H02P 7/00; H02P 27/06; H02P 7/2913; G01P 3/44

See application file for complete search history.

(56) References Cited

U.S. PATENT DOCUMENTS

| | | | |
|---|---|---|---|
| 5,659,132 A | 8/1997 | Akazawa | |
| 5,744,921 A * | 4/1998 | Makaran | ................... H02P 1/22 318/400.21 |
| 7,659,678 B2 | 2/2010 | Maiocchi | |

(Continued)

FOREIGN PATENT DOCUMENTS

| | | |
|---|---|---|
| CN | 101411048 | 4/2009 |
| CN | 201438266 | 4/2010 |
| TW | 201212503 | 3/2012 |
| WO | 2007003967 | 1/2007 |

*Primary Examiner* — Marlon Fletcher (74) *Attorney, Agent, or Firm* — Dicke Billig & Czaja, PLLC (57) ABSTRACT

An electronic switch control method is disclosed. The method comprises receiving the current working parameters of the electronic switch, then reading duty cycle parameters matching with the current working parameters; conducting a linear calculation with the duty cycle parameters and the working parameters to obtain a new duty cycle; adjusting the current control signal to obtain a PWM signal having the new duty cycle; and controlling the rotation speed of the motor in a load with the PWM signal. By reducing the volume of an electronic switch and achieving a long low-speed travel, the disclosure enables the user to work at an accurate working point with an electronic device.

3 Claims, 5 Drawing Sheets

(51) Int. Cl.
G05B 19/414 (2006.01)
H02P 31/00 (2006.01)

(56) References Cited

U.S. PATENT DOCUMENTS

| | | |
|---|---|---|
| 8,638,053 B2 | 1/2014 | Ng |
| 2004/0232872 A1 | 11/2004 | Sunaga |
| 2007/0085496 A1 | 4/2007 | Philipp et al. |
| 2007/0085521 A1 | 4/2007 | Nagai |
| 2007/0182350 A1 | 8/2007 | Patterson |
| 2008/0265808 A1* | 10/2008 | Sparey ............... H02P 6/182 318/139 |
| 2011/0090604 A1 | 4/2011 | Butler |
| 2011/0163701 A1* | 7/2011 | Carrier ............. H01M 2/1022 318/139 |
| 2011/0234132 A1 | 9/2011 | Norell |
| 2011/0248653 A1* | 10/2011 | Brotto ............... B25F 5/021 318/139 |
| 2012/0206078 A1 | 8/2012 | Norell |
| 2012/0217915 A1 | 8/2012 | Wu et al. |
| 2012/0326643 A1* | 12/2012 | Brannen ............... H02P 6/18 318/400.11 |
| 2012/0326649 A1 | 12/2012 | Patanaik et al. |
| 2014/0225544 A1 | 8/2014 | Mergener |
| 2015/0002070 A1 | 1/2015 | Ishikawa et al. |
| 2015/0256111 A1 | 9/2015 | Forster et al. |
| 2015/0333676 A1 | 11/2015 | Liu |
| 2016/0116180 A1 | 4/2016 | Hu |

* cited by examiner

ELECTRONIC SWITCH CONTROL METHOD

CROSS-REFERENCE TO RELATED APPLICATIONS

This patent application is a Divisional Application of U.S. application Ser. No. 14/368,050, entitled ELECTRONIC SWITCH CONTROLLER, ELECTRONIC SWITCH CONTROL METHOD, ELECTRONIC SWITCH AND ELECTRONIC DEVICE, filed Jun. 23, 2014 and is incorporated by reference herein.

FIELD

The disclosure relates to the field of electric devices and in particular to an electric switch controller.

BACKGROUND

Figure 1:
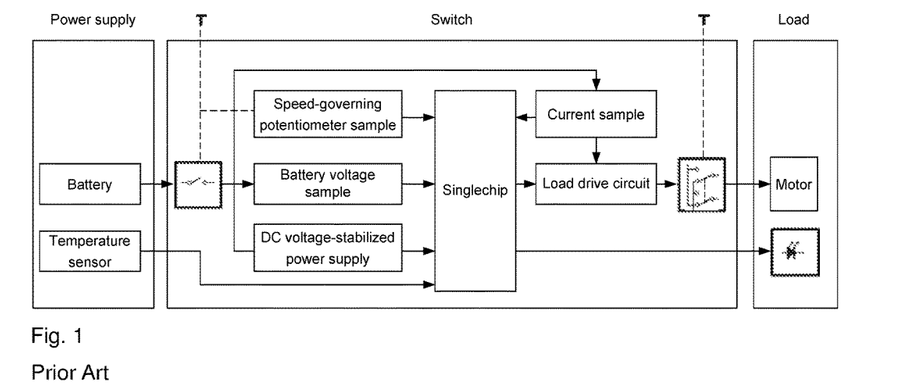
FIG. 1 shows a schematic diagram illustrating existing electronic switch.

As shown in FIG. 1, the main control part of existing electronic switch applied to a lithium battery powered tool consists mainly of a combination of a Micro Controller Unit (MCU/singlechip), a DC voltage-stabilized power supply (LDO) and a Pulse Width Modulation (PWM) driving circuit.

The micro controller unit, the voltage-stabilized power supply and the PWM driving circuit in the main controller part of the electronic switch are separated from each other and work based on the following principle:

the DC voltage-stabilized power supply (LDO) provides a stable working power supply to the singlechip so that the singlechip can run smoothly to collect the voltage signal and the temperature signal of the lithium battery, a speed-governing potentiometer signal and the current signal of a load, process the signals collected and output a PWM signal for controlling the rotation speed of a motor using a motor/load PWM driving module and, if needed, the working state of a working lamp through an I/O port at the same time.

With a plurality of electronic parts and components, the electronic switch is complicated in circuit design, large in Printed Circuit Board Assembly (PCBA) size and high in production cost.

Figure 2:
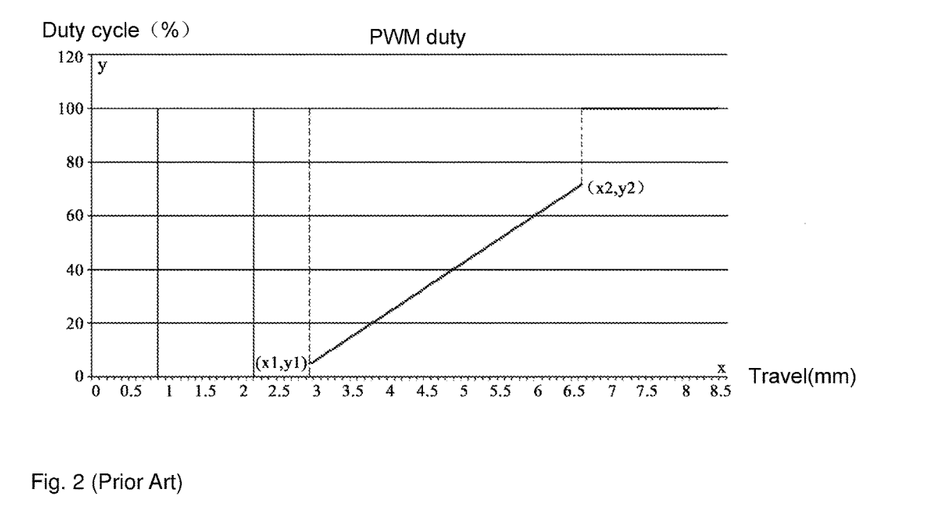
FIG. 2 shows a schematic diagram illustrating existing PWM signal.

FIG. 2 is a schematic diagram illustrating existing PWM signal. As shown in FIG. 2, the PWM signal of existing electronic switch is the single segment from (x1, y1) to (x2, y2) displayed in the single-segment linear control chart.

In FIG. 2, taking the travel of a switch as an x axis and a PWM duty cycle (PWM duty) output as a y axis, it can be obtained according to FIG. 2 that in the PWM output control curve of existing switch, y and x meet the following relationship:

$Y=0\%$ when $x<x1$;

$Y=k1*x+b1$ when $x1 \leq x < x2$, in which $k1=(y2-y1)/(x2-x1)$;

$b1=(y1-k1*x1)$;

$y=100\%$ when $x \geq x2$.

As such a PWM output control curve is a single-segment linear control, that is, the segment from (x1, y1) to (x2, y2) shown in FIG. 2 is a straight line segment, it can be known that the PWM duty output is already great when the travel of a speed-governing potentiometer is short, resulting in that a motor rotates at a relatively high rotation and vibrates, thus, the user cannot position the target working point correctly with an electric tool (e.g. an electric drill or electric hammer), causing inconvenience in the use of the electric tool.

Further, the power of a battery cannot be obtained with existing electronic switch, additionally, more expense is cost to exchange interfaces or increase connector devices when a device interface for collecting parameters of a battery or load is not matched with the input interface of existing electronic switch as existing electronic switch is poor in connection matching with other devices and is time-costing and effort-costing when being connected with other devices.

It can be known from above that existing electronic switch, which is provided with a great many of electronic components and the control curve of which is a single-segment linear control, is complicated in design, difficult in PCB wiring and short in low-speed travel and is consequentially bulky and incapable of controlling the working of an electric device at an accurate working point.

No effective solution has been proposed to address the problem that existing electronic switch, which is provided with a great many of electronic components and the control curve of which is a single-segment linear control, is complicated in design, difficult in PCB wiring and short in low-speed travel and is consequentially bulky and incapable of controlling the working of an electric device at an accurate working point.

SUMMARY

To address the problem that existing electronic switch, which is provided with a great many of electronic components and the control curve of which is a single-segment linear control, is complicated in design, difficult in PCB wiring and short in low-speed travel and is consequentially bulky and incapable of controlling the working of an electric device at an accurate working point, the disclosure provides an electronic switch controller, an electronic switch control method, an electronic switch and an electronic device.

To achieve the purpose above, in accordance with an aspect of the disclosure, there is provided an electronic switch control method, comprising: receiving the current working parameters of the electronic switch; reading duty cycle parameters matching with the current working parameters; conducting a linear calculation with the duty cycle parameters and the working parameters to obtain a new duty cycle; adjusting the current control signal to obtain a PWM signal having the new duty cycle; and controlling the rotation speed of the motor in a load with the PWM signal.

Further, the current working parameters include the current travel data of the electronic switch, and reading duty cycle parameters matching with the current working parameters comprises: reading duty cycle parameters matching with the current travel data, the duty cycle parameters including a slope parameter and an intercept parameter; and conducting a linear calculation for the current travel data according to the following formula to obtain the new duty cycle: y=kx+b, in which y represents the new duty cycle; k is the slope parameter, b is the intercept parameter, and x represents the current travel data.

Further, the current working parameters include the capacity data and the temperature data of the power supply, the current data of the load and the temperature data of the load control circuit, and before reading duty cycle parameters matching with the current working parameters, the method comprises: converting the voltage signal of the power supply/the temperature signal of the power supply/the current signal of the load/the temperature signal of the load control circuit into capacity data of the power supply/temperature data of the power supply/current data of the load/temperature data of the load control circuit; and comparing the capacity data of the power supply, the temperature data of the power supply, the current data of the load and the temperature data of the load control circuit with preset conditions and read duty cycle parameters matching with the current travel data if the capacity data of the power supply, the temperature data of the power supply, the current data of the load and the temperature data of the load control circuit meet the preset conditions.

Further, before reading duty cycle parameters matching with the current travel data and after comparing the capacity data of the power supply, the temperature data of the power supply, the current data of the load and the temperature data of the load control circuit with preset conditions, wherein the method further comprises: generating a protection signal if the capacity data of the power supply, the temperature data of the power supply, the current data of the load and the temperature data of the load control circuit fail to meet the preset conditions; converting the current control signal to a stop signal according to the protection signal; and sending the stop signal to the driving circuit and/or the voltage-stabilized power supplies to stop the working of the driving circuit and/or the voltage-stabilized power supplies as well as the working of the load.

According to the disclosure, a voltage-stabilized power supply, a driving circuit and a processor are integrated in a controller to read duty cycle parameters matching with working parameters of a power supply, a load and an electronic switch after the working parameters are obtained, calculate a new duty cycle, adjust the duty cycle of a PWM signal to the new duty cycle and generate a driving signal with the adjusted PWM signal using the driving circuit; and by using a multi-segment curve control to improve a low-speed travel, the disclosure facilitates the use by the user and achieves a user-friendly operation. By addressing the problem that the working of an electric device at an accurate working point cannot be controlled as the low-speed travel of existing electronic switch the control curve of which is a single-segment linear control is short, the disclosure realizes an electronic switch having a small volume and a long low-speed travel and enables the user to use an electronic device at an accurate working point.

BRIEF DESCRIPTION OF THE DRAWINGS

The accompanying drawings described here are provided to provide a better understanding of the disclosure and form a part of the disclosure; the exemplary embodiments disclosed herein and the explanation thereof are illustrative of the disclosure but are not to be construed as limiting the disclosure. In the accompanying drawings.

DETAILED DESCRIPTION OF THE EMBODIMENTS

It should be noted that embodiments described herein and the features thereof can be combined with each other on the condition that no conflict is caused. The disclosure is described below in detail with reference to the accompanying drawings and the embodiments.

Figure 3:
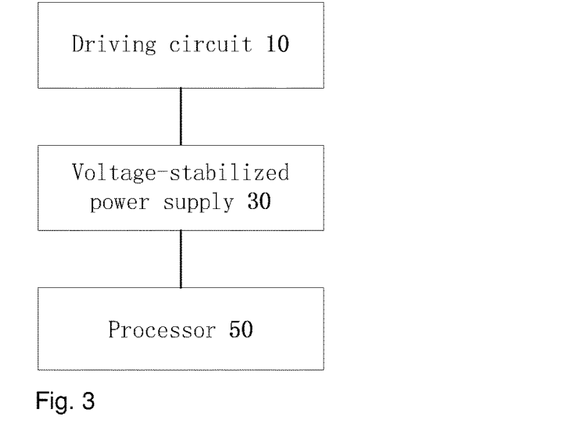
FIG. 3 shows a schematic diagram illustrating the structure of a controller for an electronic switch according to embodiments disclosed herein.
Figure 4:
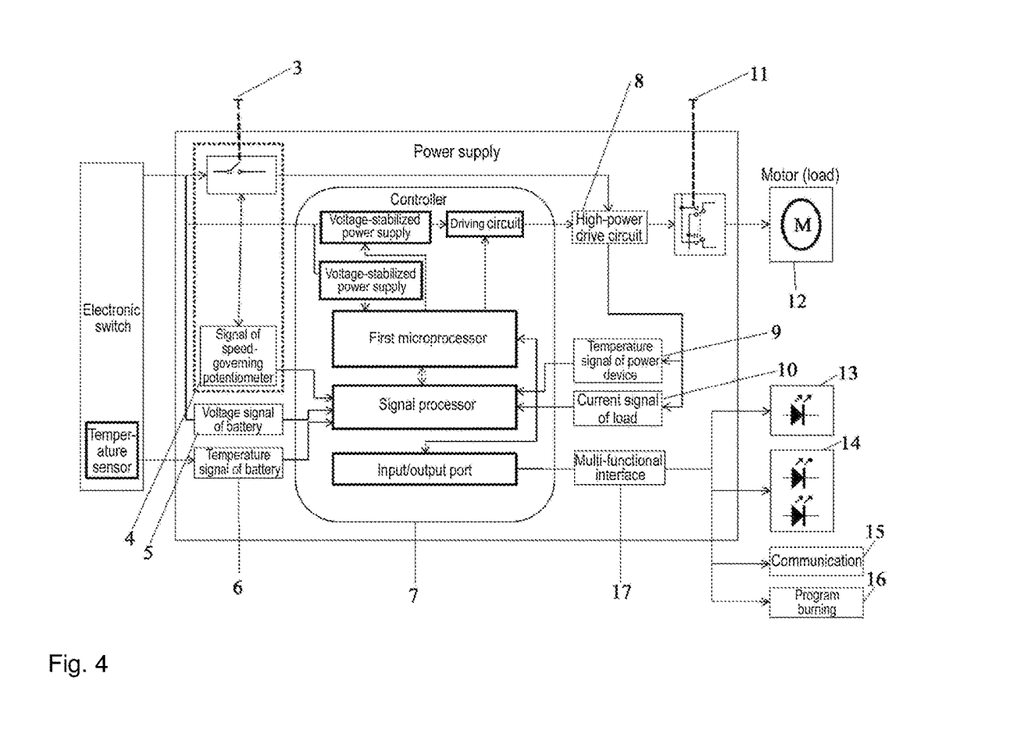
FIG. 4 shows a schematic diagram illustrating detailed structure of a controller for an electronic switch according to embodiments disclosed herein.

FIG. 3 is a schematic diagram illustrating the structure of a controller for an electronic switch according to embodiments disclosed herein. FIG. 4 is a schematic diagram illustrating detailed structure of a controller for an electronic switch according to embodiments disclosed herein.

As shown in FIG. 3 and FIG. 4, the controller comprises: voltage-stabilized power supplies 30, a processor 50 and a driving circuit 10, wherein the voltage-stabilized power supplies 30 are connected with a power supply to supply power for the processor 50 and the driving circuit 10; the processor 50 is connected between the voltage-stabilized power supplies 30 and a measurement device to receive working parameters of the power supply, the load and the electronic switch measured by the measurement device, to read duty cycle parameters matching with the working parameters, to calculate a new duty cycle with the duty cycle parameters and the working parameters, to adjust the current control signal to a PWM signal with the new duty cycle, and to send the PWM signal to the driving circuit 10; and the driving circuit 10 is connected between the voltage-stabilized power supplies 30 and the load to generate a driving signal with the PWM signal and to send the driving signal to a load control circuit to control the rotation speed of the motor in the load.

By integrating the voltage-stabilized power supplies 30, the processor 50 and the driving circuit 10 but not using voltage-stabilized power supplies 30 and a driving circuit 10 made of electronic components, the controller for an electronic switch described herein is simplified in both circuit design and component space, reduced in volume and decreased in cost. Further, after acquiring working parameters of the power supply, the load and the electronic switch, the processor 50 reads duty cycle parameters matching with the working parameters and calculates a new duty cycle, and then adjusts the duty cycle of a PWM signal to the new duty cycle and generates a driving signal using the driving circuit 10 according to the adjusted PWM signal, besides, the use of a multi-segment curve control in embodiments described herein improves a low-speed travel, facilitates the use by the user and achieves a user-friendly operation. By addressing the problem that existing electronic switch, which is provided with a great many of electronic components and the control curve of which is a single-segment linear control, is complicated in design, difficult in PCB wiring and short in low-speed travel and is consequentially bulky and incapable of controlling the working of an electric device at an accurate working point, the disclosure achieves a simple circuit design and a long low-speed travel and enables the user to use an electronic device at an accurate working point.

In the disclosure, the voltage-stabilized power supplies 30, the driving circuit 10 (that is, a PWM driving circuit) and the processor 50 are integrated into a chip. The voltage-stabilized power supplies 30 are an integrated LDO, and apparently, an operational amplifier and a timer are also contained in the integrated chip.

As the controller disclosed herein, the controller 7 (that is, an Application Specific Integrated Circuit (ASIC)) shown in FIG. 4 integrates the processor 50, the voltage-stabilized power supplies 30 and the driving circuit 10 therein to achieve the motor speed control, current protection, voltage protection, temperature protection, battery power indication and illumination for working, communication with another product or device and program burning functions needed by the conventional electric tool, reduce the difficulty in the design of an electronic switch, diminish the volume of an electronic switch and achieve an intelligent control on the electronic switch.

Specifically, the controller 7 may integrate one or more wafers which comprise: a first microprocessor (that is, a CPU), an erasable program memory (that is, a FLASHROM), an erasable data memory (that is, an EEPROM), a timer, a PWM driving module, a direct current voltage-stabilized power supply module (LDO) and an input/output port.

Further, the multi-functional interface 17 shown in FIG. 4 may be a multi-functional multiplexing function which may be used to indicate the power of a battery, provide working illumination, communicate with another product or device or program the controller 7.

Further, according to the foregoing embodiments, the working parameters of the power supply, the load and the electronic switch measured by the measurement device are analog signals, wherein the processor 50 may comprise: an input port which is connected with the measurement device to receive the analog signals measured by the measurement device; a signal processor connected with the input port to convert the analog signals to digital signals; and a first microprocessor connected with the signal processor to read duty cycle parameters matching with the digital signals, to calculate a new duty cycle with the duty cycle parameters and the working parameters, to adjust the current control signal to a PWM signal with the new duty cycle, and to send the PWM signal to the driving circuit 10.

Specifically, the processor 50 may comprise: an input port for receiving the analog signals measured by the measurement device; after the input port receives the analog signals measured by the measurement device, the signal processor converts the analog signals received to digital signals; the first microprocessor reads the duty cycle parameters matching with the digital signals, calculates a new duty cycle with the duty cycle parameters and the working parameters, adjusts the current control signal to a PWM signal having the new duty cycle, and sends the PWM signal to the driving circuit 10. The signal processor, which may be the analog signal processor shown in FIG. 4, may comprise: a multi-channel analog-to-digital converter (that is, an ADC), an analog operational amplifier (OPA) and an analog comparator.

In the foregoing embodiments, the working parameters include a voltage signal carrying the trigger position information the electronic switch, wherein the first microprocessor comprises: a first sub-processor connected with the signal processor to read the current travel data of the electronic switch matching with the voltage signal carrying the trigger position information of the electronic switch; a second sub-processor connected with the first sub-processor to read duty cycle parameters matching with the current travel data, wherein the duty cycle parameters including a slope parameter k and an intercept parameter b; a first calculator connected with the second sub-processor to obtain a new duty cycle y of the control signal by conducting a linear calculation for the current travel data x according to the following formula: y=kx+b; a third sub-processor connected with the first calculator to adjust the duty cycle of the current control signal to a PWM signal with the new duty cycle y; and a first output port connected with the third sub-processor to send the PWM signal to the driving circuit 10.

Specifically, when the switch 3 (that is, the trigger) is pressed down, the driving circuit 10 switches on the power supply, the speed-governing potentiometer is activated simultaneously, and the input port acquires the analog signals measured by the measurement device, the signals including: the voltage signal of the battery, the temperature signal of the battery, the temperature signal of the power device, the signal of the speed-governing potentiometer and the current signal of the load, sequentially, the analog signal processor in the processor 50 converts the analog signals to digital signals, reads duty cycle parameters matching with the digital signals using the first microprocessor, calculates a new duty cycle with the duty cycle parameters and the working parameters, adjusts the current control signal to a PWM signal with the new duty cycle, and sends the PWM signal to the driving circuit 10.

Figure 5:
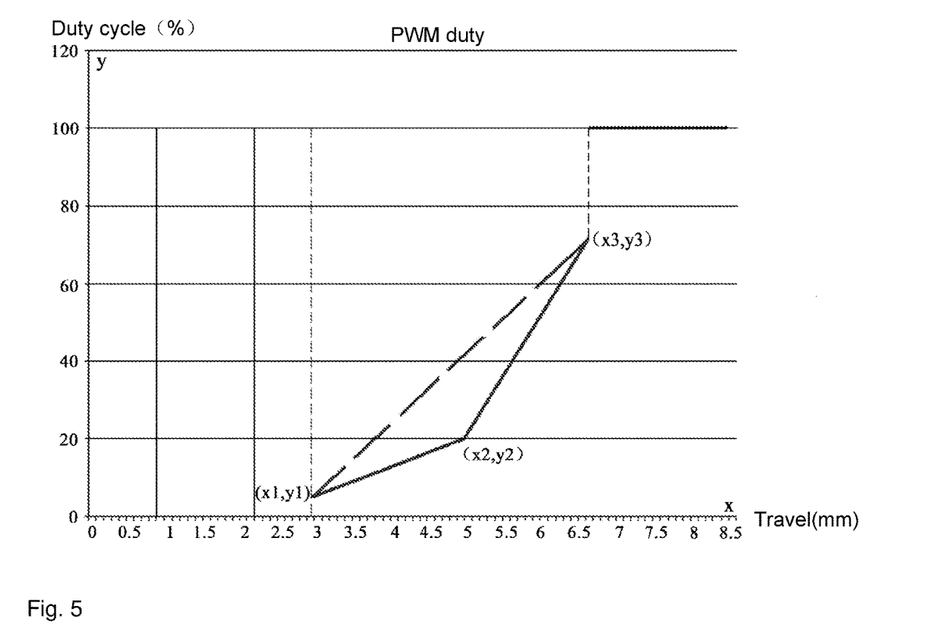
FIG. 5 shows a schematic diagram illustrating a two-segment linear PWM signal output curve according to embodiments disclosed herein.
Figure 6:
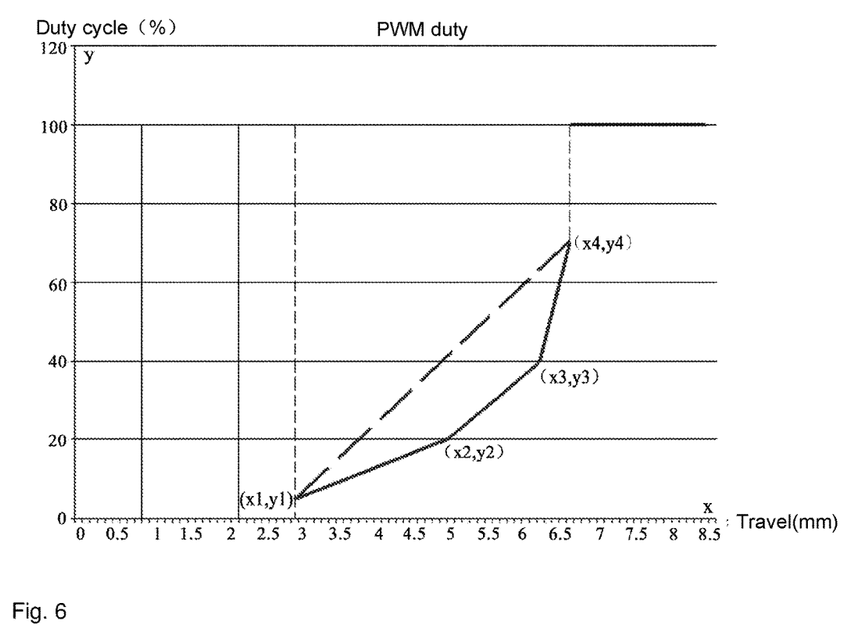
FIG. 6 shows a schematic diagram illustrating a three-segment linear PWM signal output curve according to embodiments disclosed herein.

FIG. 5 is a schematic diagram illustrating a two-segment linear PWM signal output curve according to embodiments disclosed herein. FIG. 6 is a schematic diagram illustrating a three-segment linear PWM signal output curve according to embodiments disclosed herein.

Specifically, as shown in FIG. 5 and FIG. 6, the first microprocessor uses different control curves according to specifications of different electric devices and specifications of electronic switches.

In FIG. 5, by taking the travel of the electronic switch as an x axis and the PWM duty as a y axis, it can be obtained that y and x meet the following relationship:

$Y=0\%$ when $x<x1$;

$Y=k1*x+b1$ when $x1 \leq x<x2$, in which $k1=(y2-y1)/(x2-x1)$, $b1=(y1-k1*x1)$;

$Y=k2*x+b2$ when $x2 \leq x<x3$, in which $k2=(y3-y2)/(x3-x2)$, $b2=(y2-k2*x2)$; and $Y=100\%$ when $x \geq x3$.

When the processor 50 controls the electronic switch, the first microprocessor sets duty cycle parameters (that is, values of k1, b1, k2 and b2 shown in FIG. 5 and FIG. 6) and three reference values (two coordinate values (x1, y1) and (x2, y2) in FIG. 5 and FIG. 6) in advance.

In the foregoing embodiments, the first sub-processor reads the travel data of the electronic switch matching with the voltage signal carrying the trigger position information of the electronic switch, which is the current travel x in this embodiment, then the second sub-processor reads duty cycle parameters (including a slope parameter k and an intercept parameter b) matching with the current travel data x:
the slope parameter k and the intercept parameter b are both 0 when $x<x1$;
the slope parameter k and the intercept parameter b are k1 and b1 when $x1 \leq x<x2$;
the slope parameter k and the intercept parameter b are k2 and b2 when $x2 \leq x<x3$; and $Y=100\%$ when $x \geq x3$.

The first calculator conducts a linear calculation according to the following formula to obtain a new duty cycle y of the control signal: y=kx+b; and the third sub-processor adjusts the current control signal to a PWM signal with the new duty cycle y and then sends the PWM signal to the driving circuit 10 via the first output port.

In FIG. 6, by taking the switch travel as an x axis and the PWM duty output as a y axis, it can be obtained that y and x meet the following relationship:

$Y=0\%$ when $x<x1$;

$Y=k1*x+b1$ when $x1 \leq x<x2$, in which $k1=(y2-y1)/(x2-x1)$, and $b1=(y1-k1*x1)$;

$Y=k2*x+b2$ when $x2 \leq x<x3$, in which $k2=(y3-y2)/(x3-x2)$, and $b2=(y2-k2*x2)$;

$Y=k3*x+b3$ when $x3 \leq x<x4$, in which $k3=(y4-y3)/(x4-x3)$, and $b3=(y3-k3*x3)$; and $Y=100\%$ when $x \leq x4$.

In the control curve shown in FIG. 6, the processor needs to store three preset parameter values ((x1, y1), (x2, y2) and (x3, y3)) in advance. The second sub-processor reads duty cycle parameters (including a slope parameter k and an intercept parameter b) matching with the current travel data x:
the slope parameter k and the intercept parameter b are both 0 when $x<x1$;
the slope parameter k and the intercept parameter b are k1 and b1 when $x1 \leq x<x2$;
The slope parameter k and the intercept parameter b are k2 and b2 when $x2 \leq x<x3$;
the slope parameter k and the intercept parameter b are k3 and b3 when $x3 \leq x<x4$; and $Y=100\%$ when $x \geq x4$.

Processing methods of the first calculator and the third sub-processor are the same as those described in the foregoing embodiments. FIG. 5 and FIG. 6 show the control method of the first microprocessor which realizes an intelligent switch output curve to achieve a long low-speed travel of the motor in the load for the user to work at an accurate working point conveniently.

Figure 7:
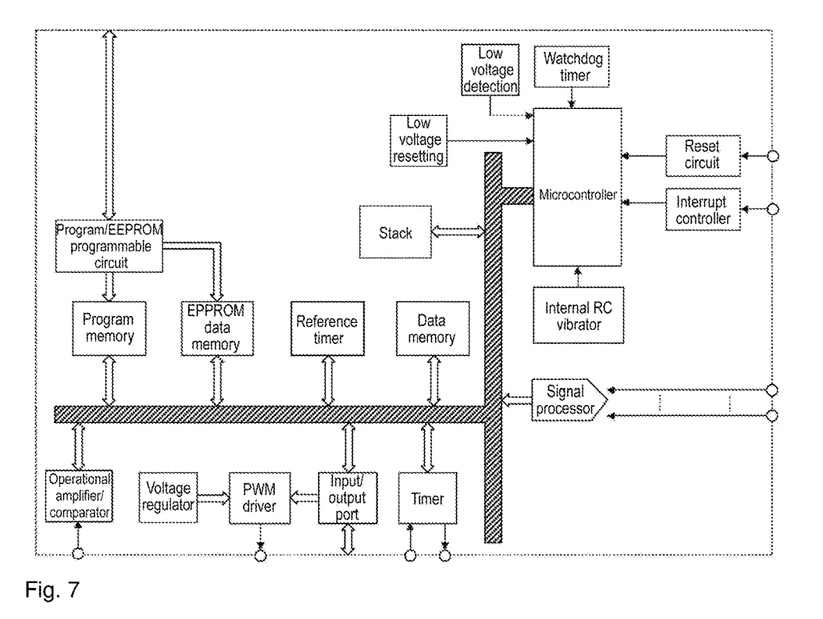
FIG. 7 shows a schematic diagram illustrating the internal structure of a controller according to embodiments disclosed herein.

When the trigger on the electronic switch is pressed down, the speed-governing potentiometer is activated with the trigger, and the speed-governing potentiometer acquires the travel of the trigger. As is shown in FIG. 7, when the trigger is pushed from the left to the right, a main contact point, that is, the driving circuit 10, switches on the power supply; a sliding sheet, as is fixed with a trigger level, moves from the left to the right as the trigger is pushed from the left to the right; moreover, the sliding sheet is tightly close to a potentiometer (the carbon film on a printed circuit board) and a potentiometer output point, so a corresponding voltage change is generated at the potentiometer output point, the voltage change signal is the voltage signal carrying the trigger position information of the electronic switch and collected by the speed-governing potentiometer, and the travel of the speed-governing potentiometer, that is, the travel of the electronic switch, can be calculated according to the voltage signal.

The output control curves shown in FIG. 5 and FIG. 6 are two or multi-segment linear control, in which the longer the travel of the switch is, the greater the PWM duty output by the processor is, and the higher the rotation speed of the motor driven by the driving circuit 10 using the load driving circuit (a high-power driving circuit, that is, the load control circuit described in the foregoing embodiments) is; the shorter the travel of the switch is, the smaller the PWM duty output by the processor is, and the lower the rotation speed of the motor driven by the driving circuit 10 using the high-power driving circuit is; the whole travel of the switch may include two or more segments of linear curves, each of which involves an independent linear relationship between the PWM duty and the travel, and each independent linear relationship corresponds to a unique linear relationship slope, thus achieving an intelligent switch output curve.

In proportion to the PWM duty, the current in the motor in the load is small when the PWM duty is small, accompanied with a low rotation speed of the motor. The two or multi-segment PWM duty control increases the current of the motor slowly as the travel increases within a low-speed travel range, thereby slowing down the change of the rotation speed of the motor (that is, load) in the case of a low-speed travel, which facilitates the use by the user and enables the user to work at an accurately positioned working point with a stably running electric tool.

According to the foregoing embodiments, the working parameters may further include: the voltage signal and the temperature signal of the power supply, the current signal of the load and the temperature signal of the load control circuit, wherein the signal processor comprises: a first sub-signal processor connected between the input port and the first microprocessor to convert the voltage signal of the power supply to capacity data of the power supply; a second sub-signal processor connected between the input port and the first microprocessor to convert the temperature signal of the power supply to temperature data of the power supply; a third sub-signal processor connected between the input port and the first microprocessor to convert the current signal of the load to current data of the load; and a fourth sub-signal processor connected between the input port and the first microprocessor to convert the temperature signal of the load control circuit to temperature data of the load control circuit.

Specifically, the capacity data of the power supply is converted from the voltage signal of the power supply; the temperature data of the power supply and the temperature of the power device are calculated by looking up the temperature signal of the power supply and the specification of the temperature sensor in a table; and the current data flowing through the motor is calculated by using a voltage signal corresponding to the current signal of the load acquired.

Moreover, according to the foregoing embodiments, parameters including the capacity of the battery of the current power supply, the temperature of the battery, the temperature of a power device and the current flowing through the motor in a load can be obtained, and the controller 7 controls or adjusts a PWM duty according to the parameters to control the rotation speed of the motor, the indication of a battery level and the working lamp.

In the foregoing embodiments, the second sub-processor may comprise: a fourth sub-processor which is respectively connected with the first sub-signal processor, the second sub-signal processor, the third sub-signal processor and the fourth sub-signal processor to compare the capacity data of the power supply, the temperature data of the power supply, the current data of the load and the temperature data of the load control circuit with preset conditions, to read a duty cycle parameter matching with the current travel data x if the capacity data of the power supply, the temperature data of the power supply, the current data of the load and the temperature data of the load control circuit meet the preset conditions or to generate a protection signal if the capacity data of the power supply, the temperature data of the power supply, the current data of the load and the temperature data of the load control circuit fail to meet the preset conditions.

Specifically, the preset conditions may include: a first preset range, a second preset range, a third preset range and a fourth preset range, wherein the fourth sub-processor comprises: a seventh sub-processor connected with the first sub-signal processor to compare the capacity data of the power supply with the first preset range and generate a voltage protection signal if the capacity data of the power supply is not in the first preset range; an eighth sub-processor connected with the second sub-signal processor to compare the temperature data of the power supply with the second preset range to generate a first temperature protection signal if the temperature data of the power supply is not in the second preset range; a ninth sub-processor connected with the third sub-signal processor to compare the current data of the load with the third preset range and to generate a current protection signal if the current data of the load is not in the third preset range; and a tenth sub-processor connected with the fourth sub-signal processor to compare the temperature data of the load control circuit with the fourth preset range and to generate a second temperature protection signal if the temperature data of the load control circuit is not in the fourth preset range. The first preset range/second preset range/third preset range/fourth preset range may change with different electric devices and different electronic switches.

According to the foregoing embodiments, the third sub-processor may comprise: a sixth sub-processor connected between the fourth sub-processor and the driving circuit 10 to convert the current control signal to a stop signal according to the protection signal, to send the stop signal to the driving circuit 10 and/or the voltage-stabilized power supplies 30 to stop the working of the driving circuit 10 and/or the voltage-stabilized power supplies 30 as well as the working of the load.

Specifically, the first preset range/second preset range/third preset range/fourth preset range may be the normal voltage/current/temperature range of the electronic switch running smoothly. The fourth sub-processor generates a protection signal if the current of the load is greater than the protection current value set by the electronic switch, or the voltage data of the power supply is lower than the stated minimum working voltage, or the temperature of the power supply is higher or lower than the stated battery working temperature range, then the sixth sub-processor converts the current control signal to a stop signal after acquiring the protection signal, the stop signal may be sent to the driving circuit 10 and/or the voltage-stabilized power supplies 30 to stop the working of the driving circuit 10 and/or the voltage-stabilized power supplies 30 as well as the working of the load, thereby achieving the current protection, the voltage protection and the temperature protection needed by the electric tool.

In the foregoing embodiments, the processor may further comprise: a second microprocessor which is connected between the input port and the voltage-stabilized power supplies 30 to generate a start signal when the input port receives the working parameters of the power supply and the load measured by the measurement device to start the voltage-stabilized power supplies 30 to supply power for the processor and the driving circuit 10.

Further, there are maybe two voltage-stabilized power supplies 30 consisting of a first sub voltage-stabilized power supply and a second sub voltage-stabilized power supply, wherein the first sub voltage-stabilized power supply is connected between the power supply and the processor to supply power for the processor, and the second sub voltage-stabilized power supply is connected among the power supply, the processor and the driving circuit 10 to start the power supply for the driving circuit 10 after receiving the start signal from the processor and to cut off the power supply for the driving circuit 10 after receiving the stop signal from the processor. The voltage-stabilized power supplies 30 could be direct current voltage-stabilized power supplies.

In combination with what is shown in FIG. 4, the first direct current voltage-stabilized power supply (that is, the LDO shown in FIG. 4) supplies working power for the first microprocessor, the erasable program memory, the erasable data memory, the timer and the analog signal converter contained in the first microprocessor, the analog operational amplifier and the analog comparator; and the second direct current voltage-stabilized power supply supplies working power for the driving circuit 10 (that is, the PWM driving circuit shown in FIG. 4) to guarantee the reliable and effective working of the driving circuit 10.

Specifically, the first sub voltage-stabilized power supply supplies little power for the processor, and the second sub voltage-stabilized power supply starts to supply power for the driving circuit 10 after acquiring the start signal from the processor and stops the power supply for the driving circuit 10 after acquiring the stop signal from the processor. In this embodiment, as the driving circuit 10 needs a great amount of power to drive the load driving circuit, the separate power supply for the driving circuit 10 and the processor by different voltage-stabilized power supplies increases the working stability of the circuit. Besides, by controlling the working state of the second sub voltage-stabilized power supply according to the start signal and the stop signal, the working of the second sub voltage-stabilized power supply can be stopped without driving the load driving circuit with a great amount of power, thus reducing the waste of power.

In the foregoing embodiments, the processor may further comprise: a second output port which is respectively connected with the signal processor, the second sub-processor and the second microprocessor to send the digital signals, the stop signal and the start signal to the indicator via the multi-functional interface so that the indicator can display working states of the power supply, the electronic switch and the load; the second output port is also used to realize the communication between the controller and the communication device via the multi-functional interface.

For example, a working indication lamp may be connected via the multi-functional interface to indicate whether or not the electric device is in the working state, the battery level, the temperature of the power supply and the temperature of the load are indicated by a power indicator, and the second output port may be connected with a communication device via the multi-functional interface to communicate with the communication device, for example, a program may be burnt or debugged via the multi-functional interface.

With the multi-functional interface 17, the controller 7 is connected with the power indication lamp 14 and the working lamp 13 or communicates with another product or device. The communication with another product or device includes the communication with a battery pack or an electrical device with an interface in accordance with the RS-232 standard or a computer to facilitate design debugging, production test, technical update and information management.

The embodiment shown in FIG. 4 also shows an electronic switch which may comprise: a trigger, a measurement device, a load control circuit and a controller, wherein the trigger is connected with a power supply to switch on or off a circuit between the power supply and the electronic switch and to generate the travel of the electronic switch; the measurement device is connected among the power supply, the load, the trigger and the controller to measure working parameters of the power supply, the load and the trigger and to send the working parameters to the controller; the controller is connected between the measurement device and the load to receive the working parameters of the power supply, the load and the trigger measured by the measurement device, after acquiring a PWM signal by adjusting the current control signal according to the working parameters, the controller generates a control signal with the PWM signal and sends the control signal to the load control circuit; and the load control circuit is connected with the controller to control the rotation speed of the motor in the load with the control signal. As shown in FIG. 4, the trigger also switches on or off a circuit between the power supply and the load via the load control circuit.

By integrating voltage-stabilized the power supplies, the driving circuit and the processor in the controller but not using voltage-stabilized the power supplies and the driving circuit consisting of electronic components, the electronic switch described herein is simplified in both circuit design and component space, reduced in the volume of the controller and decreased in cost; further, after acquiring working parameters of the power supply, the load and the electronic switch, the processor reads duty cycle parameters matching with the working parameters and calculates a new duty cycle, and then adjusts the duty cycle of a PWM signal to a new duty cycle and generates a driving signal with the adjusted PWM signal using the driving circuit; besides, the use of a multi-segment curve control in embodiments described herein improves a low-speed travel, facilitates the use by the user and achieves a user-friendly operation. By addressing the problem that existing electronic switch, which is provided with a great many of electronic components and the control curve of which is a single-segment linear control, is complicated in design, difficult in PCB wiring and short in low-speed travel and is consequentially bulky and incapable of controlling the working of an electric device at an accurate working point, the disclosure achieves a simple circuit design and a long low-speed travel and enables the user to use an electronic device at an accurate working point.

According to the foregoing embodiments, the measurement device comprises: a first temperature sensor which is connected with the power supply to measure the temperature signal of the power supply; a voltage sensor which is connected with the power supply to measure the voltage signal of the power supply; a speed-governing potentiometer which is connected with the trigger to measure a voltage signal carrying the trigger position information of the electronic switch; a current sensor which is connected with the load to measure the current signal of the load; and a second temperature sensor connected with the load control circuit to measure the temperature signal of the load control circuit.

The electronic switch may further comprise a sub-switch; specifically, the sub-switch may be a two-way switch which is connected with the load control circuit and the load to switch on or switch off the circuit between the load control circuit and the load and short-circuited load output. With the sub-switch, the power supply for the load control circuit could be switched on and the load output short-circuit (that is, a brake contact point) could be broken when the trigger is pressed down, and power supply for the load control circuit could be switched off and two output terminals of the motor could be connected (that is, a load output short-out) when the trigger is released, thereby controlling a motor brake effectively (that is, stopping the rotation of the motor immediately) to control the working of the motor accurately.

FIG. 4 also shows an electronic device comprising an indicator and an electronic switch, wherein the indicator is connected with the second output port of a controller in the electronic switch to indicate working states of the power supply, the electronic switch and the load.

Specifically, the power supply supplies power for the electronic switch and the electronic switch controls the working of the load.

Further, the indicator may comprise: a first indicator lamp for indicating working states of the power supply and the electronic switch; and an illuminating lamp for providing illumination for the user when the electronic device is running.

Figure 8:
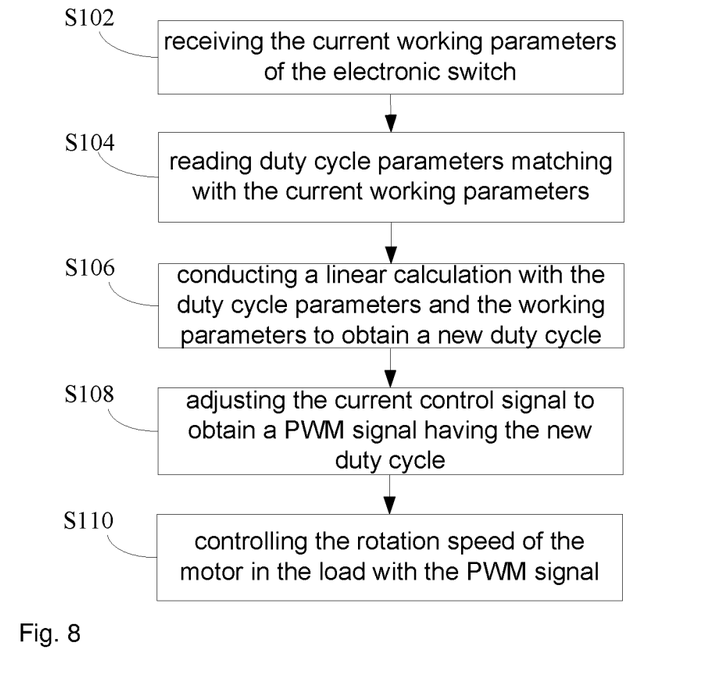
FIG. 8 shows a flowchart of an electronic switch control method according to embodiments disclosed herein.

FIG. 8 is a flowchart illustrating a control method for the electronic switch according to embodiments disclosed herein, as is shown in FIG. 8, the method comprises:

Step S102: receiving the current working parameters of the electronic switch;

Step S104: reading duty cycle parameters matching with the current working parameters;

Step S106: conducting a linear calculation with the duty cycle parameters and the working parameters to obtain a new duty cycle;

Step S108: adjusting the current control signal to obtain a PWM signal with the new duty cycle; and Step S110: controlling the rotation speed of the motor in the load with the PWM signal.

By reading duty cycle parameters matching with working parameters of a power supply, the load and the electronic switch after acquiring the working parameters and sequentially calculating a new duty cycle, adjusting the duty cycle of a PWM signal to the new duty cycle and generating a driving signal with the adjusted PWM signal using a driving circuit, the method described herein improves a low-speed travel with a multi-segment curve control to facilitate the use by the user and achieve a user-friendly operation. By addressing the problem that the working of an electric device at an accurate working point cannot be controlled as the low-speed travel of existing electronic switch the control curve of which is a single-segment linear control is short, the disclosure achieves a long low-speed travel and enables the user to use an electronic device at an accurate working point.

According to the foregoing embodiments, the current working parameters may include the current travel data of the electronic switch, wherein the step of reading duty cycle parameters matching with the current working parameters comprises: reading duty cycle parameters matching with the current travel data, the duty cycle parameters including a slope parameter and an intercept parameter; and conducting a linear calculation for the current travel data according to the following formula to obtain a new duty cycle: $y=kx+b$, in which y represents the new duty cycle; k is the slope parameter, b is the intercept parameter, and x represents the current travel data.

As shown in FIG. 5 and FIG. 6, the first microprocessor uses different control curves according to different specifications of electric devices and electronic switches.

In FIG. 5, by taking the travel of the electronic switch as an x axis and the PWM duty as a y axis, it can be obtained that y and x meet the following relationship:

$Y=0\%$ when $x<x1$;

$Y=k1*x+b1$ when $x1 \leq x<x2$, in which $k1=(y2-y1)/(x2-x1)$, $b1=(y1-k1*x1)$;

$Y=k2*x+b2$ when $x2 \leq x<x3$, in which $k2=(y3-y2)/(x3-x2)$, $b2=(y2-k2*x2)$; and $Y=100\%$ when $x \geq x3$;

When the processor controls the electronic switch, the first microprocessor sets duty cycle parameters (that is, values of k1, b1, k2 and b2 shown in FIG. 5) and three reference values (two coordinate values (x1, y1) and (x2, y2) in FIG. 5) in advance.

In the foregoing embodiments, the first sub-processor reads the travel data of the electronic switch matching with a voltage signal carrying the trigger position information of the electronic switch, which is the current travel x of the electronic switch in this embodiment, then the second sub-processor reads duty cycle parameters (including a slope parameter k and an intercept parameter b) matching with the current travel data x:

the slope parameter k and the intercept parameter b are both 0 when x<x1;
the slope parameter k and the intercept parameter b are k1 and b1 when x1≤x<x2;
the slope parameter k and the intercept parameter b are k2 and b2 when x2≤x<x3; and $Y=100\%$ when $x \geq x3$.

The first calculator conducts a linear calculation according to the following formula to obtain the new duty cycle y of the control signal: y=kx+b, and the third sub-processor adjusts the duty cycle of the current control signal to a PWM signal with the new duty cycle y and then sends the PWM signal to the driving circuit via the first output port.

In FIG. 6, by taking the switch travel as an x axis and the PWM duty output as a y axis, it can be obtained that y and x meet the following relationship:

$Y=0\%$ when $x<x1$;

$Y=k1*x+b1$ when $x1 \leq x<x2$, in which $k1=(y2-y1)/(x2-x1)$, $b1=(y1-k1*x1)$;

$Y=k2*x+b2$ when $x2 \leq x<x3$, in which $k2=(y3-y2)/(x3-x2)$, $b2=(y2-k2*x2)$;

$Y=k3*x+b3$ when $x3)c<x4$, in which $k3=(y4-y3)/(x4-x3)$, and $b3=(y3-k3*x3)$; and $Y=100\%$ when $x \geq x4$.

In the control curve shown in FIG. 6, the processor needs to store three preset parameter values in advance: (x1, y1), (x2, y2) and (x3, y3). The second sub-processor reads duty cycle parameters (including a slope parameter k and an intercept parameter b) matching with the current travel data x:

the slope parameter k and the intercept parameter b are both 0 when x<x1;
the slope parameter k and the intercept parameter b are k1 and b1 when x1≤x<x2;
the slope parameter k and the intercept parameter b are k2 and b2 when x2≤x<x3;
the slope parameter k and the intercept parameter b are k3 and b3 when x3≤x<x4, and $Y=100\%$ when $x \geq x4$.

Processing methods of the first calculator and the third sub-processor are the same as those described in the foregoing embodiments. FIG. 5 and FIG. 6 show a control method for the first microprocessor which realizes an intelligent switch output curve to achieve a long low-speed travel of the motor in a load and make it more convenient for the user to work at an accurate working point.

In the foregoing embodiments, the current working parameters may include: the capacity data and the temperature data of the power supply, the current data of the load and the temperature data of the load control circuit, wherein before reading duty cycle parameters matching with the current working parameters, the method comprises: converting the voltage signal of the power supply/the temperature signal of the power supply/the current signal of the load/the temperature signal of the load control circuit to capacity data of the power supply/temperature data of the power supply/current data of the load/temperature data of the load control circuit respectively; and comparing the capacity data of the power supply, the temperature data of the power supply, the current data of the load and the temperature data of the load control circuit with preset conditions to read duty cycle parameters matching with the current travel data.

In the foregoing embodiments, the current working parameters include: the capacity data and the temperature data of the power supply, the current data of the load and the temperature data of the load control circuit, wherein before reading duty cycle parameters matching with the current travel data and after comparing the capacity data of the power supply, the temperature data of the power supply, the current data of the load and the temperature data of the load control circuit with preset conditions, the method further comprises: generating a protection signal if the capacity data of the power supply, the temperature data of the power supply, the current data of the load and the temperature data of the load control circuit fail to meet the preset conditions; converting the current control signal to a stop signal according to the protection signal; and sending the stop signal to the driving circuit and/or the voltage-stabilized power supplies to stop the working of the driving circuit and/or the voltage-stabilized power supplies as well as the working of the load.

It should be noted that the steps shown in the accompanying flowchart can be executed in, for example, a computer system consisting of a group of computer-executable instructions, moreover, although a logic order is shown in the flowchart, the shown or described steps can be executed in a different order in some cases.

It can be seen from the description above that the disclosure achieves the following technical effect: by reading duty cycle parameters matching with working parameters of a power supply, the load and the electronic switch after acquiring the working parameters and sequentially calculating a new duty cycle, adjusting the duty cycle of a PWM signal to the new duty cycle and generating a driving signal with the adjusted PWM signal using a driving circuit, the disclosure improves a low-speed travel with a multi-segment curve control, facilitates the use by the user and achieves a user-friendly operation. By addressing the problem that the working of an electric device at an accurate working point cannot be controlled, which is because the low-speed travel of existing electronic switch whose control curve is a single-segment linear control is short, the method disclosed herein achieves a long low-speed travel and enables the user to use an electronic device at an accurate working point.

With the adoption of a dedicated integrated chip design (integrating an LDO, an MCU, an operational amplifier, a timer, an analog signal converter and a PWM driving module) to integrate lithium battery powered electric tool protection functions and to simplify the production process of the switch as well as the production process of an electric tool, the disclosure simplifies circuit design and component space and reduces cost; moreover, the disclosure can control the rotation speed of a motor, protect a lithium battery pack (including current, voltage and temperature protection) and additionally improve the motor control curve, improve the low-speed travel with a multi-segment curve control to facilitate the use by the user and to achieve a user-friendly operation; besides, with additional battery level indication and multi-functional interface, the disclosure facilities functional extension and application.

Apparently, it should be understood by those skilled in this art that the modules or steps of the disclosure can be realized by a universal computer, centralized on a single computer or distributed on a network consisting of multiple computers, and optionally realized by computer-executable program codes; the modules or steps can be therefore stored in a memory device to be executed by a computer or separately manufactured into integrated circuit modules, alternatively, some of the modules or steps are manufactured into a single integrated circuit module. Thus, the disclosure is not limited to any special combination of hardware and software.

The description above is just the preferred embodiments of the present invention, and is not intended to limit the present invention. For the person skilled in this art, the present invention can have various alterations and changes. Any such change, equivalent substitution or improvement made within the principle of the present invention should be covered in the protection scope of the present invention.

What is claimed is:

1. An electronic switch control method, comprising:
   receiving the current working parameters of the electronic switch;
   reading duty cycle parameters matching with the current working parameters;
   conducting a linear calculation with the duty cycle parameters and the working parameters to obtain a new duty cycle;
   adjusting the current control signal to obtain a PWM signal having the new duty cycle; and
   controlling the rotation speed of the motor in a load with the PWM signal;
   wherein the current working parameters include the current travel data of the electronic switch, and reading duty cycle parameters matching with the current working parameters including:
   reading the current travel data of the electronic switch matching with the voltage signal carrying the trigger position information the electronic switch;
   reading duty cycle parameters matching with the current travel data, the duty cycle parameters including a slope parameter and an intercept parameter; and
   conducting a linear calculation for the current travel data according to y=kx+b to obtain the new duty cycle wherein y represents the new duty cycle, k is the slope parameter, b is the intercept parameter, and x represents the current travel data;
   wherein a control curve corresponding to y=kx+b, is a multi-segment curve.

2. The method according to claim 1, wherein the current working parameters include the capacity data and the temperature data of the power supply, the current data of the load and the temperature data of the load control circuit, and before reading duty cycle parameters matching with the current working parameters, the method comprises:
   converting the voltage signal of the power supply/the temperature signal of the power supply/the current signal of the load/the temperature signal of the load control circuit into capacity data of the power supply/temperature data of the power supply/current data of the load/temperature data of the load control circuit; and
   comparing the capacity data of the power supply, the temperature data of the power supply, the current data of the load and the temperature data of the load control circuit with preset conditions and read duty cycle parameters matching with the current travel data if the capacity data of the power supply, the temperature data of the power supply, the current data of the load and the temperature data of the load control circuit meet the preset conditions.

3. The method according to claim 2, wherein before reading duty cycle parameters matching with the current travel data and after comparing the capacity data of the power supply, the temperature data of the power supply, the current data of the load and the temperature data of the load control circuit with preset conditions, wherein the method further comprises:
   generating a protection signal if the capacity data of the power supply, the temperature data of the power supply, the current data of the load and the temperature data of the load control circuit fail to meet the preset conditions; converting the current control signal to a stop signal according to the protection signal; and
   sending the stop signal to the driving circuit and/or the voltage-stabilized power supplies to stop the working of the driving circuit and/or the voltage-stabilized power supplies as well as the working of the load.

* * * * *